(12) United States Patent
Klenke

(10) Patent No.: US 7,623,197 B2
(45) Date of Patent: Nov. 24, 2009

(54) FLAT SCREEN

(75) Inventor: Martin Klenke, Blieskastel (DE)

(73) Assignee: Nanogate Advanced Materials GmbH, Saarbruecken (DE)

( * ) Notice: Subject to any disclaimer, the term of this patent is extended or adjusted under 35 U.S.C. 154(b) by 300 days.

(21) Appl. No.: 11/367,291

(22) Filed: Mar. 3, 2006

(65) Prior Publication Data

US 2008/0007671 A1 Jan. 10, 2008

Related U.S. Application Data

(60) Provisional application No. 60/691,717, filed on Jun. 17, 2005.

(30) Foreign Application Priority Data

Mar. 10, 2005 (EP) ................................ 05005249

(51) Int. Cl.
    *G02F 1/1335* (2006.01)
(52) U.S. Cl. ............... 349/61; 349/62; 349/63; 349/64; 349/65; 349/66; 349/67; 349/68; 349/69; 349/70; 349/71; 362/612; 362/615; 362/619
(58) Field of Classification Search ............. 349/61–71; 362/612
    See application file for complete search history.

(56) References Cited

U.S. PATENT DOCUMENTS 5,499,138 A * 3/1996 Iba ............................. 359/569
6,007,209 A 12/1999 Pelka ........................... 362/30
6,011,602 A * 1/2000 Miyashita et al. .............. 349/65
6,991,358 B2 * 1/2006 Kokogawa ................... 362/619
2003/0086030 A1 * 5/2003 Taniguchi et al. .............. 349/61
2004/0105046 A1 * 6/2004 Taira et al. ..................... 349/61
2004/0156182 A1 * 8/2004 Hatjasalo et al. .............. 362/31
2005/0041174 A1 * 2/2005 Numata et al. ................. 349/61
2005/0122743 A1 * 6/2005 Lin ............................. 362/615

FOREIGN PATENT DOCUMENTS

| EP | 0 985 952 | 3/2000 |
| EP | 1 566 233 | 8/2005 |
| JP | 2003330106 | 11/2003 |
| JP | 2005049763 | 2/2005 |
| WO | WO 01/14790 | 3/2001 |

OTHER PUBLICATIONS

European Search Report for EP 05 00 5249 dated Jul. 21, 2005.

* cited by examiner

*Primary Examiner*—David Nelms
*Assistant Examiner*—Thanh-Nhan P Nguyen
(74) *Attorney, Agent, or Firm*—Ballard Spahr LLP

(57) ABSTRACT

A flat screen comprises a liquid-crystal element, such as an LCD element, for representing an image. Further, a plurality of point light sources, such as LEDs, are provided. Between the point light sources and the liquid-crystal element a light-guiding element is arranged. For rendering the brightness distribution more uniform, the light-guiding element comprises at a surface thereof a plurality of diffractive surface elements arranged in cells.

19 Claims, 2 Drawing Sheets

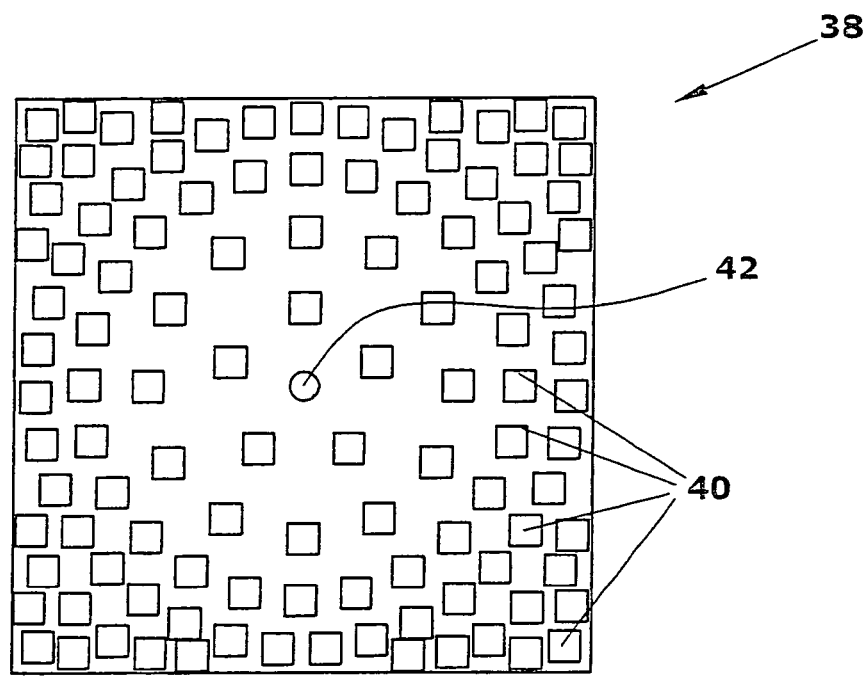
Fig.3
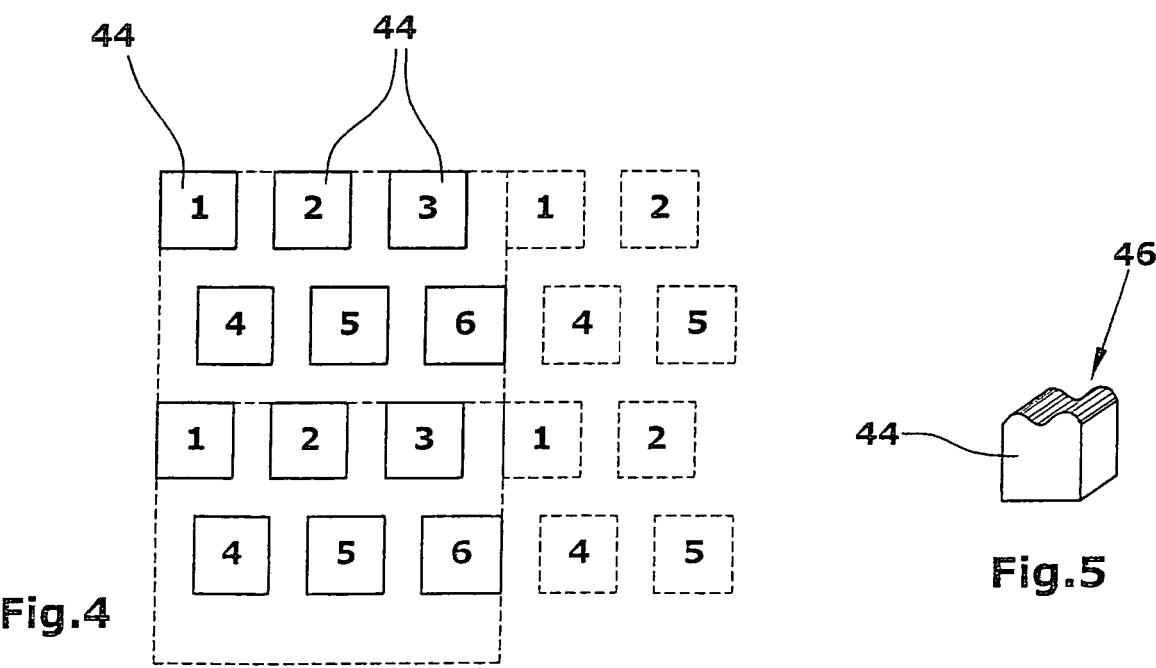
Fig.4
Fig.5

FLAT SCREEN

CROSS REFERENCE TO RELATED APPLICATIONS

This application claims priority to European patent application No. 05 005 249.1 filed on Mar. 10, 2005, and to U.S. provisional patent application No. 60/691,717 filed Jun. 17, 2005, which applications are hereby incorporated by this reference in their entireties.

BACKGROUND OF THE INVENTION

The invention relates to a flat screen, and in particular to an LCD screen lit by LEDs.

Known screens with liquid-crystal elements comprise an illuminating element, such as a light box, in which a plurality of fluorescent tubes, in particular CCFLs, are arranged. To render the illumination of the liquid-crystal element more uniform, light-guiding elements are arranged between the illuminating element, i.e. the tubes, and the liquid-crystal element. These light-guiding elements are films designated BEF, DBEF and PRF. For the purpose in question, the BEF film has a surface comprising a plurality of small prisms. These prisms are refractive surface elements. The DBEF film serves for changing the polarizing direction of light reflected from the rear side of the liquid-crystal element and returning it to the liquid-crystal element. The PRF film serves for polarizing the light. The use of such films has the drawback that the films absorb a portion of the light such that the integral brightness of the screen is reduced.

Further, flat screens are known which use white LEDs instead of tubes, such as CCFLs. For obtaining a relative uniform illumination and thus a relatively uniform brightness distribution across the cross-section of the flat screen, it is necessary to provide a plurality of LEDs. In known LED flat screens the LEDs are arranged at a distance to each other of approximately 1 mm. In a screen with an edge length of 40 cm×30 cm thus at least 500-1000 LEDs are provided. This entails considerable costs and a high assembly effort. Further, the large number of LEDs leads to a considerable heat development.

It is an object of the invention to provide a flat screen which can be manufactured at low costs while offering good light efficiency.

SUMMARY OF THE INVENTION

The flat screen according to the invention comprises a liquid-crystal element, such as an LCD element, for the purpose of representing an image. Here, the individual liquid crystals can be driven via a TFT. Further, the flat screen according to the invention comprises a plurality of light sources, such as LEDs, as illuminating element and/or light box. Between the liquid-crystal element and the illuminating element a light-guiding element is arranged. According to the invention, a surface of the light-guiding element comprises a diffractive surface element, particularly numerous surface elements. By providing diffractive surface elements, the light emitted by the light sources is diffracted such that the brightness distribution and/or the wavelength distribution are rendered more uniform.

By providing diffractive surface elements at the surface of the light-guiding element, the light, which is e.g. conically emitted by an LED, can be diffracted and distributed such that the brightness distribution across the overall cross-section of the flat screen can be rendered more uniform.

Since the surface elements have, for example, a wavelike surface structure, the wavelength of the light emitted by the diffractive surface elements can be defined in dependence on the configuration of the wave structure, i.e. in particular the height and the width of the individual waves. It is thus further possible to render the wavelength range of the emitted light more uniform. Here, the individual surface elements, which may in particular comprise differently shaped surfaces, influence the wavelength of the light emitted by point light sources such that preferably monochromatic light and/or white light is produced.

It is particularly preferred to configure the individual surface elements such that the amplitude of the different surface structures is constant and only the frequency is changed. This ensures that the diffraction efficiency is constant across the overall cross-section. Depending on the type of surface structure, which must not necessarily by a sinusoidal surface structure, all raised portions are, more generally expressed, of equal height but are arranged at different distances to each other. Consequently, the light emitted by the light source is diffracted in different ways by the individual surface elements. It is of particular advantage that varying distances are easier to produce than varying heights.

Provision of a light-guiding element comprising a plurality of surface elements, which are arranged at the surface according to the invention, allows the number of the individual point light sources and/or LEDs to be considerably reduced. At constant brightness distribution and constant effective brightness of the flat screen, the number of LEDs can be reduced by more that 10%, and in particular more than 40%.

The light-guiding element according to the invention is preferably made from a transparent plastic material, such as PMMA, PEC, PET, PE etc. and/or a mineral glass. The thickness of the light-guiding element preferably lies in the range from 0.1 mm to 20 mm, and in particular from 0.5 mm to 5 mm.

The light-guiding element according to the invention allows omission of any further light-guiding components, such as films, between the exit surface of the light-guiding element and the display of the screen and/or the liquid-crystal element. In particular the BEF film may be omitted. Apart from any reflection elements surrounding the light-guiding element in a frame-like manner, the invention provides for a transflective or transmissive background lighting without any further light-guiding elements. By providing diffractive surface elements at the exit surface of the light-guiding element the construction of the flat screen can be simplified. This improves the quality and in particular the service life of the flat screen.

Preferably, the individual surface elements are configured such that they act as diffractive elements which preferably produce a collimated light bundle with spectral separation of light. For this purpose, the individual surface elements preferably comprise surface structures with a wavelike cross-section, wherein the distance between the waves is selected in dependence on the wavelength to be deflected. Here, individual surface elements preferably comprise different diffraction gratings. It is particularly preferred that the surface elements are arranged such that mainly monochromatic and/or white light is produced by superposition of at least two adjacent light bundles. In this context, monochromatic light means a wavelength range of ±100 nm, and in particular ±50 nm. By providing such surface elements according to the invention, a largely monochromatic, and in particular collimated light with a high luminous flux density can be produced.

The configuration of the surface elements further allows the radiation direction of the light from the exit surface to be adjusted. For this purpose, the diffraction grating provided at the surface elements is to be modified in accordance with the Fraunhofer diffraction laws. The adjustability preferably lies in the range from 0-90° relative to the exit surface.

It is further possible to adjust the color temperature of the emitted light by selection and/or configuration of the surface element structure. Preferably, the color temperature can be adjusted in the range from 3000 K-10,000 K.

By configuring the exit surface with diffractive surface elements according to the invention, in particular spectral splitting is prevented or considerably reduced. Further, a sufficient light intensification at low energy consumption is ensured. Moreover, provision of the diffractive surface elements, and in particular the arrangement of the surface elements, may allow a good collimation of the light to be achieved. Here, it is particularly preferred that these advantages can be realized without providing any further light-guiding systems, such as diffractive or refractive films, for the purpose of light intensification or collimation.

The diffractive surface elements according to the invention preferably have a size of $0.04\,\mu m^2$ to $10,000\,\mu m^2$, in particular $0.04\,\mu m^2$ to $500\,\mu m^2$. When an in particular sinusoidal surface structure of the surface elements is provided, said surface structure has an amplitude of 550 nm. For example, six differently configured surface elements are provided which preferably have an amplitude of 550 nm. Here, the individual surface elements have a frequency of, for example, 490 nm, 503 nm, 517 nm, 530 nm, 575 nm and 620 nm. In particular, a diffractive surface element has a sinusoidal vibration. The distance of the individual surface elements to each other preferably lies in the range from 0-100 μm, in particular 0-50 μm, and more preferably 0-15 μm. Preferably, the distance of the individual surface elements to each other is always >0 μmm, in particular always >5 μm, and most preferably always >10 μm.

In a particularly preferred configuration of the flat screen, a plurality of surface elements with different surface structures are combined to form a surface element group. Here, the different surface structures are selected such that one surface element group essentially emits white light. The type of surface structure, in particular the change in the wavelength of the light caused by the surface structure, is determined in dependence on the wavelength ranges emitted by the point light source, such as the LED, wherein preferably LEDs essentially emitting white light are used.

Preferably, the light-guiding element comprises only a few different surface element groups. It is particularly preferred to provide only a single surface element group.

Preferably, each individual surface element group comprises at least two, preferably six or eight surface elements. The individual surface elements are preferably arranged in a staggered relationship. In particular, the individual surface elements are arranged in several, preferably two rows with a gap therebetween.

Here, for example, six surface elements are combined to form a surface element group, wherein the six surface elements preferably have the same amplitude of, for example, 550 nm. The frequencies of the six surface elements preferably differ from each other. In particular, the individual surface elements have a frequency of 490 nm, 503 nm, 517 mm, 530 nm, 575 nm and 620 mm.

In a particularly preferred embodiment of the invention, one cell per point light source and/or per LED is provided at the exit and/or entry surface of the light-guiding element. Each cell comprises a plurality of surface elements and/or surface element groups. Here, the individual surface element groups and/or surface elements are arranged such that the brightness and the wavelength distribution of the light emitted by each point light source are rendered more uniform. For this purpose, the density of the surface elements and/or the surface element groups increases from one location, in particular the center of the cell, in outward direction. The distance of the surface elements and/or the surface element groups to each other thus decreases with increasing distance to that location and/or the center. Preferably, the point light source is arranged behind the center of the cell.

For rendering the light leaving the light-guiding element even more uniform, it is particularly preferred to configure the cell in the region where the point light source is located, in particular in the center, in such a manner that it has a lower transparency. Preferably, the transparency increases from the center of the cell in outward direction. Preferably, the change in the transparency can be effected by applying a lacquer in different thicknesses. It is particularly preferred to provide the lacquer or another curing liquid on one side of the light-guiding element and the individual surface elements on the opposite side of the light-guiding element.

To achieve as uniform a distribution of the brightness as possible over the overall screen surface and in particular in the corners of the screen, the distances between the individual surface elements and/or the individual surface element groups differ from each other such that the distances are smaller in regions which are darker in prior art screens. These are in particular the edge regions and the corners.

Preferably, the individual point light sources and/or LEDs are arranged at a distance to each other of at least 5 mm, preferably at least 10 mm.

A device which is particularly suitable for manufacturing the diffractive surface elements and a corresponding method are described in EP 05 003 354.

For manufacturing the diffractive surface elements in particular the following material is suitable:

11 g of 1H,1H,2H,2H-perfluoroctyl acrylate were mixed with 8 g of dipropylene glycol diacrylate, 0.1 g of Irgacure® 819 and 0.2 g of Irgacure® 184 of Ciba Spezialitätenchemie Lampersheim GmbH. 60 μl of this mixture were applied to a 2×2 cm large nickel plate whose surface comprised a negative pattern of a mold with scattering centers. Subsequently, a 1 mm thick and 1×1 cm large lamella of PMMA was applied to the surface of the mixture on the nickel plate. Then the thus produced sandwich on the nickel plate with the mixture contained therein was exposed for 2 seconds to UV radiation from a commercially available UV mercury lamp. Subsequently, the substrate and the cured molding compound bonded therewith were removed from the negative casting mold.

BRIEF DESCRIPTION OF THE DRAWINGS

Hereunder a preferred embodiment the invention is described in detail with reference to the appended drawings in which:

FIG. 3 shows a schematic top view of a cell of the light-guiding element, FIG. 4 shows an example of a possible arrangement of surface elements in surface element groups, and FIG. 5 shows an example of a surface structure of an individual surface element.

DESCRIPTION OF THE PREFERRED EMBODIMENTS

Figure 1:
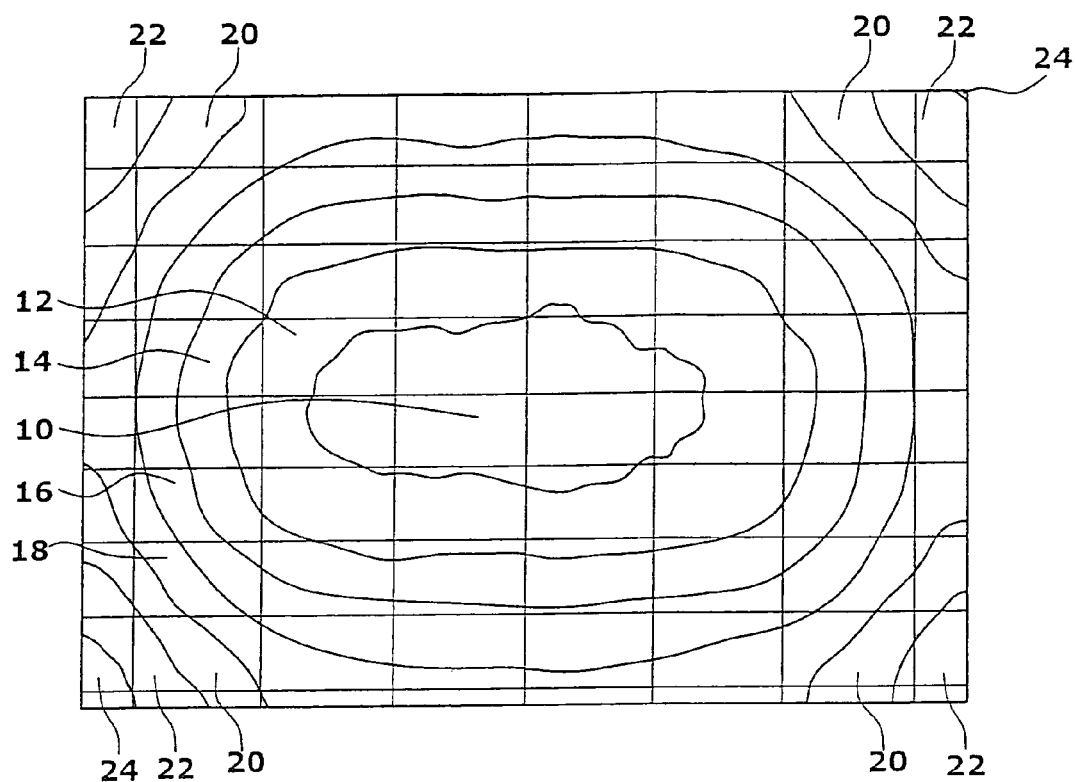
FIG. 1 shows a brightness diagram of a prior art LCD screen lit by LEDs.

The diagram of FIG. 1 schematically shows a brightness distribution of an LCD screen. Said screen is an LCD screen backlit by LEDs, wherein in prior art a BEF film and a DBEF film are provided between the LEDs and the LCD screen for the purpose of rendering the illumination more uniform. In the diagram the brightness is largest in an inner region 10 and decreases essentially concentrically in outward direction in the regions 12,14,16,18. The darkest regions occur in the corners, wherein here, too, the brightness decreases from the regions 20 via the regions 22 towards the regions 24.

Figure 2:
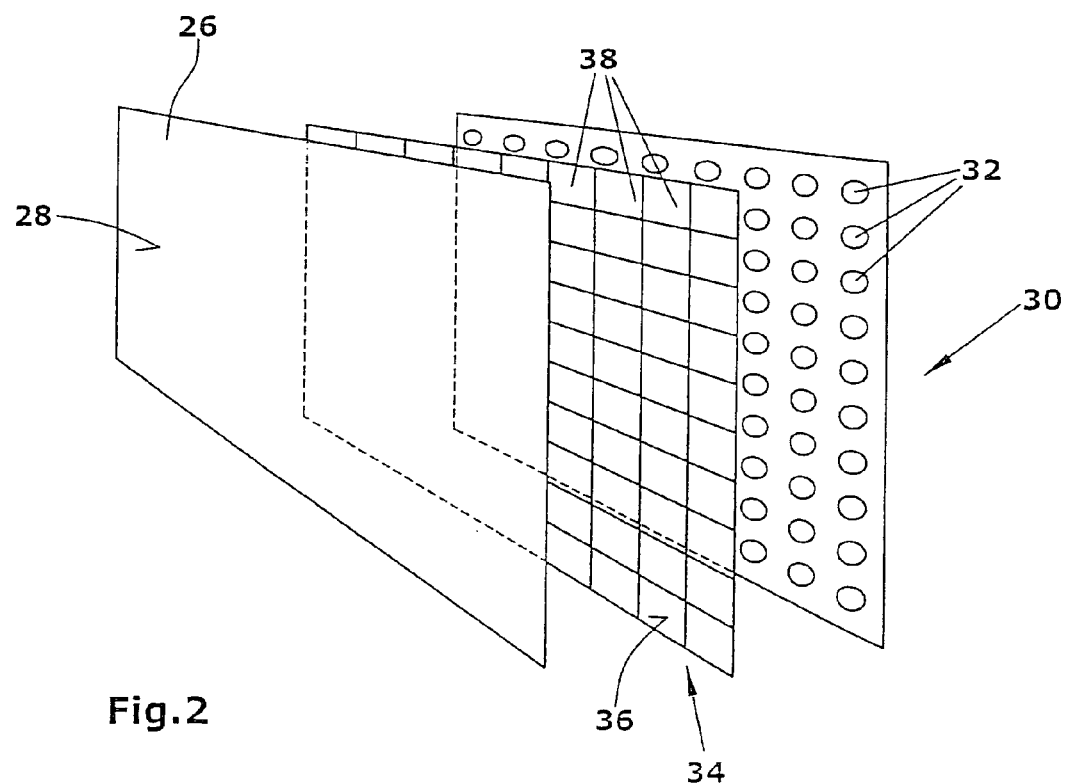
FIG. 2 shows a schematic perspective simplified representation of the basic construction of an LCD screen according to the invention.

An LCD flat screen according to the invention (FIG. 2) comprises an LCD element and/or a liquid-crystal element 26 on whose front side 28 the image is represented. In a light box and/or illuminating element 30 a plurality of point light sources in the form of LEDs 32 are arranged. In the illustrated embodiment, said LEDs 32 are arranged at a regular mutual distance of 10 mm.

According to the invention, a light-guiding element 34 of transparent plastic material or glass is arranged between the illuminating element 30 and the LCD element 26. At a surface 36 of the light-guiding element 34 a plurality of cells 38 are arranged. Each of the mutually adjacent cells 38 comprises a plurality of individual surface element groups 40 (FIG. 3). Preferably, the individual surface element groups are arranged concentrically with a center 42, wherein the point light source 32 is arranged behind the center 42. As shown in FIG. 3, the mutual distance of the individual surface element groups 40 decreases with increasing distance to the center 42. Relating to a cell 38, the density of surface element groups 40 thus decreases from the interior and/or the center 42 in outward direction.

Preferably, a lacquer is applied to a surface of the light-guiding element 34 located opposite the surface 36, said lacquer obscuring the center 42 at whose level the LED 32 is arranged. Here, the lacquer is preferably applied such that the transparency of the light-guiding element 34 of each cell increases from the center 42 in outward direction.

The individual surface element groups 40 comprise a plurality of individual surface elements 44. In the illustrated embodiment, each individual surface element group 40 comprises six surface elements 42, designated 1-6 in FIG. 4.

The individual surface elements 44 act as diffraction gratings. Here, different surface elements 44 may be provided which are configured as linear diffraction gratings with different grating constants. The surface 46 (FIG. 5) of individual surface elements 44 is, for example, configured as a phase-sinusoidal grating.

According to the invention, the individual surface elements 44, and in particular the surface structure 46 of the surface elements 44, are, for example, manufactured by lithographic processes.

It is particularly preferred to attach the surface elements with the aid of a curing lacquer to the surface of the light-guiding element. For this purpose, preferably a mold, into which the negative pattern of the diffraction grating is introduced by lithographic processes, is used. With the aid of a single mold preferably a plurality of diffractive surface elements can be molded. A particularly preferred manufacturing process and a suitable material for manufacturing the surface elements are described in EP 05 003 358.

For coupling-out light of different wavelengths, preferably different surface elements 44, i.e. surface elements 44 with different surface structures 46, are provided. For example, as shown in the embodiment illustrated in FIG. 4, said surface elements are six different surface elements 44 which are designated 1 to 6 in FIG. 4. As shown in FIG. 4, the different surface elements 1 to 6 configured for coupling out light of a specific wavelength are arranged in a repeating structure in the illustrated embodiment.

In the illustrated embodiment, the surface elements 44 are of square configuration and have an edge length of approximately 15 μm

The invention claimed is:

1. A flat screen comprising:
a liquid-crystal element for image representation,
an illuminating element comprising a plurality of point light sources,
a light-guiding element arranged between the illuminating element and the liquid-crystal element, and
diffractive surface elements at a surface of the light-guiding element, for rendering the brightness distribution and/or the wavelength distribution more uniform, wherein the surface elements have a size of 0.04-10,000 μm$^2$ and are arranged at a distance to each other of 0-100 μm, wherein the individual surface elements are arranged at a distance to each other of 0-15 μm.

2. The flat screen according to claim 1, characterized in that the individual surface elements act as diffraction gratings which produce a collimated light bundle with spectral light splitting.

3. The flat screen according to claim 1, characterized in that the surface elements are arranged such that by superposition of at least two adjacent light bundles monochromatic light and/or white light is produced.

4. The flat screen according to claim 1, wherein the surface elements have a size of 0.04-500 μm$^2$.

5. The flat screen according to claim 1 wherein a plurality of surface elements with different surface structures are combined to form a surface element group for the purpose of producing essentially white light.

6. The flat screen according to claim 5, characterized in that the location of the surface element group is matched to the location of the point light sources.

7. The flat screen according to claim 5, characterized in that the number of surface element groups in the edge region, in particular in the corners, is increased.

8. The flat screen according to claim 5, characterized in that, on a top side of the light-guiding element, cells comprising a plurality of surface element groups are arranged, wherein one cell is assigned to each point light source.

9. The flat screen according to claim 5, characterized in that the distance between the surface element groups decreases from a cell center in outward direction.

10. The flat screen according to claim 1, characterized in that the location of the surface elements is matched to the location of the point light sources.

11. The flat screen according to claim 1, characterized in that the point light sources are arranged at a distance to each other of at least 5 mm, and preferably at least 10 mm.

12. The flat screen according to claim 1, characterized in that the point light sources are LED's which essentially emit white light.

13. A flat screen comprising:
a liquid-crystal element for image representation,
an illuminating element comprising a plurality of point light sources,
a light-guiding element arranged between the illuminating element and the liquid-crystal element, and
diffractive surface elements at a surface of the light-guiding element, for rendering the brightness distribution and/or the wavelength distribution more uniform, wherein the number of surface elements in the edge region, in particular in the corners, is increased.

14. The flat screen according to claim 1, characterized in that, on the surface of the light-guiding element, cells comprising a plurality of surface elements are arranged, wherein one cell is assigned to each point light source.

15. The flat screen according to claim 14, characterized in that each point light source is arranged concentrically with a cell.

16. The flat screen according to claim 14, characterized in that the distance between the surface elements decreases from a cell center in outward direction.

17. The flat screen according to claim 14, characterized in that the individual cells of the light-guiding element comprises regions of lower transparency opposite the individual point light sources.

18. The flat screen according to claim 17, characterized in that the transparency of each cell increases from the center of the cell in an outward direction.

19. A flat screen comprising:
a liquid-crystal element for image representation,
an illuminating element comprising a plurality of point light sources,
a light-guiding element arranged between the illuminating element and the liquid-crystal element, and
diffractive surface elements at a surface of the light-guiding element, for rendering the brightness distribution and/or the wavelength distribution more uniform, wherein the number of point light sources in the edge region, in particular in the corners, is increased.

* * * * *